Patented Oct. 5, 1948

2,450,766

UNITED STATES PATENT OFFICE 2,450,766

ALUMINUM OXIDE COMPOSITIONS

Alan C. Nixon and Orris L. Davis, Berkeley, Calif., assignors to Shell Development Company, San Francisco, Calif., a corporation of Delaware No Drawing. Application May 26, 1947, Serial No. 750,642

3 Claims. (Cl. 252—436)

This invention relates to solid contact or adsorptive materials. It deals particularly with a new form of aluminum oxide useful as a catalyst or catalyst carrier, or for other purposes, and with a new method for activating aluminum oxide and improving its properties.

One important object of the invention is to provide new catalysts for promoting chemical reactions, particularly aluminum oxide-containing catalysts which are of special advantage in the treatment of hydrocarbons. Another object is to provide new aluminum oxide catalysts which may be employed in various processes over long periods of time with minimum loss in catalytic activity. A further object is to provide a new and improved form of aluminum oxide which may be subjected to repeated regeneration without excessive loss of desirable properties. Still another object is to provide an economical method for the practical production of the new compositions of the invention. Further objects and advantages of the compositions and methods of the invention will be apparent from the following description.

A great many methods of treating aluminum oxide to increase its porosity or alter its catalytic activity have been proposed. For some purposes treatment with nitric or hydrochloric acids, for example, has been found useful. In such activations the usual procedure is to immerse or wash the chosen alumina with the selected reagent and, after sufficient treatment, to withdraw and dry the treated alumina which is then ready for use.

It has now been found that improved results may be obtained by treating aluminas with sulfamic acid instead of or in addition to the acids heretofore used. While, for certain purposes, it is satisfactory to merely treat the alumina with sulfamic acid and dry the resulting product, it has been discovered that greatly enhanced catalytic activity is achieved by a new method of operation comprising treating an alumina with sulfamic acid and decomposing, at least in part, the sulfamic acid taken up by the alumina in the treatment.

The exact nature of the changes which are brought about by the sulfamic acid treatment according to the invention are not fully understood. Several factors possibly contribute to the improved results. Thus, the presence in the finished product of sulfamic acid or its decomposition products, particularly its sulfur products of decomposition which can be readily detected by analysis, may be one factor in bringing about the observed improvement, and changes in the pore structure which result from the treatment may be another. The removal of soluble constituents from the alumina may also contribute to the new results since it has been found desirable for certain applications of the new compositions to carry out the treatment with sulfamic acid until the sodium content of the alumina is reduced to at least 0.2%, and more preferably below 0.1%. The reduction in sodium does not, however, account for the improvements brought about by the treatment, as shown by the fact that other treatments producing an equally great reduction in sodium content do not give the same advantageous results. Furthermore, the sulfamic acid treatment is advantageous with aluminas of initially low sodium content. Whatever the explanation may be, however, the new compositions show marked improvements over the aluminas previously available, particularly with respect to catalytic activity.

Although aluminum oxide is recognized as a catalyst for a number of conversions and is known to act as a true catalyst promoter for many catalytic agents, such in particular as metal oxides, the promotion of chromium oxide by alumina being an excellent example, for instance, not all aluminas are equivalent for these purposes. In certain conversions, for example, as in certain oxidation processes where a short and uniform contact of the reactants with the catalyst is desirable in order to avoid excessive side reactions, aluminas of low porosity are superior. In these cases precipitated aluminas containing considerable amounts of combined water and having little or no available inner surface may be used. Alpha alumina, which is the corundum form, has an available surface of at most only a few square meters per gram and cannot be activated, but these properties make it ideally suited for catalysts of the low surface type. For other reactions, particularly the conversions of hydrocarbons and reactions in which the new compositions of the invention are to be used in conjunction with other catalytic materials either as activators or supports or both, an alumina having a large inner surface as shown by its adsorptive capacity is desirable. The preferred aluminas for the present invention are activated, i. e. adsorptive, aluminas which have a large available catalytic surface, preferably an available surface of at least 60 square meters per gram, and more preferably above 100 square meters per gram.

Suitable adsorptive aluminas may be prepared from the gamma aluminas of the Haber system. Haber (Naturwiss 13, 1007 (1925)) classifies the various forms of alumina into two systems designated by him as the gamma and beta systems, according to their behavior upon heating. The gamma aluminas of the Haber classification comprise gamma alumina and all of the so-called hydrated aluminas which, upon heating, are converted to alpha alumina through the gamma form. The beta aluminas of the Haber system of classification comprise those aluminas such as diaspore which, upon heating, are converted directly to alpha alumina without going through the gamma form. The classification of aluminas into two systems, designated gamma and beta, according to Haber, is not to be confused with the fundamental true alumina forms. This classification is merely for the purpose of dividing the common forms of alumina into two distinct groups. Thus, the various so-called hydrated aluminas which are classified as belonging to the gamma system in the Haber classifications are totally distinct from the true gamma alumina, and diaspore is not a beta alumina. The aluminas which upon heating are converted into alpha alumina through gamma alumina and belong to the gamma system of the Haber classification are:

The alumina alpha trihydrate, known as gibbsite or hydrargillite. This form is readily prepared synthetically and occurs in nature in the mineral, gibbsite, and as a component of certain bauxites;

The alumina beta trihydrate, known also as bayerite. It is isomorphous with hydrargillite. It does not occur naturally, but may be prepared synthetically by proper control of the precipitation conditions;

The alumina alpha monohydrate, known as böhmite. This alumina is formed by the partial dehydration of either of the above two trihydrates;

Gamma alumina. This is a meta-stable anhydrous oxide which does not occur naturally, but may be prepared by carefully controlled dehydration of any of the first three mentioned hydrates;

Gelatinous aluminum hydroxide. This frequently encountered alumina is amorphous when freshly precipitated, but after aging the characteristic lines of böhmite can be detected by X-ray analysis. On further aging, the precipitate is gradually transformed to bayerite and finally to hydrargillite;

Bauxite. This ore is of varied composition. The term "bauxite" was used in the older literature to designate the dihydrate. It is now known that bauxite consists of an extremely finely divided mixture of two or more of the known aluminas and certain argillaceous residues. No dihydrates of aluminas have ever been observed. Suitable sources of adsorptive bauxites and their properties are described, for example, in "Industrial and Engineering Chemistry," vol. 37, pages 1148–1152 (December 1945), and vol. 38, pages 839–842 (August 1946).

Activated aluminas such as "Alorco" Grade A Activated Alumina or other grades of the same trade-mark are also suitable. "Alorco" H—40, for example, is a gel-type alumina containing about 5% silica and having an available surface of about 390 square meters per gram, which may be used.

According to a preferred method of operation the chosen alumina, preferably in relatively finely divided form, for example 8–14 mesh, is treated with an aqueous solution of either sulfamic acid or suitable sulfamic acid salts (calcium, magnesium, beryllium, zinc, cadmium, mercury and aluminum sulfamates, for instance, are suitable) or other derivatives thereof, and it will be understood that the expression "sulfamic treated alumina" as used hereinafter in the claims is intended to cover aluminas activated by any such sulfamic compounds. The treatment may be effected by immersing the alumina in the sulfamic treating solution preferably while agitating as in a revolving drum or the like. The treatment with sulfamic acid or one or more of its salts may advantageously be carried out at ordinary temperature but higher temperatures up to the boiling point of the treating solution under the operating pressure may be used to shorten the necessary time of treatment. At ordinary temperature one to five hours of contact with treating solution of about 5 to 20 per cent concentration are usually sufficient, but longer or shorter periods of time may be used with sulfamic acid solutions of other concentrations. It is desirable to reduce the sodium content of the alumina to at least 0.2% and more preferably below 0.1%. After the treatment with the sulfamic solution is complete, the excess solution is drained off and the catalyst dried. After drying at about 100° C. to 175° C., for example, analyses show that the presence of sulfamate in the alumina is indicated by the considerable amounts of nitrogen and sulfur present. As previously pointed out, for certain purposes the sulfamic treated alumina thus produced is satisfactory for use without further processing. In other uses, for example, as catalyst for the isomerization of olefins, activated alumina which has been sulfamic acid treated and merely dried shows little or no increased activity in the reaction. However, calcination of the sulfamic treated alumina renders these catalysts highly active for these reactions, making them definitely superior to other treated aluminas. A temperature of 300° C. to 700° C., preferably about 450° C. to 550° C., is suitable for calcination which advantageously is carried out for about 1 to 6 hours. Analysis of calcined sulfamic treated alumina catalysts shows that the nitrogen but practically none of the sulfur from the sulfamic acid is lost during calcination. The activity of the catalyst for the isomerization of olefins, for instance, increases with the amount of nitrogen thus lost and the most desirable catalysts for this purpose are those in which practically all the nitrogen but none of the sulfur is removed during calcination.

The new sulfamic treated aluminas of the invention, particularly when calcined as described, are particularly advantageous for the isomerization of olefins, whether of straight or branched chain structure, to produce products of different structure. Especially good results have been obtained with the new catalysts in reactions of this type, particularly the isomerization of olefin polymers. However, the new catalysts are also effective in a number of other reactions. Thus, in the hydroforming of petroleum fractions the sulfamic acid treated aluminas when calcined give high yields of products of superior octane number. They are also active catalysts for the cracking and reforming of hydrocarbons and have been found useful for the depolymerization of olefin polymers. Higher boiling olefin polymers can be efficiently converted to hydrocarbons, boiling within the gasoline range by means of the new catalysts. Such depolymerization can be carried out with simultaneous isomerization of the depolymerization products so that unusually high quality motor fuel components are obtained.

The catalysts thus prepared were compared in the isomerization and depolymerization of di-isobutylene under the following conditions:

Temperature (° C.) _____ 300
Pressure (p. s. i. gage) _____ 0
Liquid hourly space velocity _____ 5
Apparent contact time (sec.) _____ 2.4

The following results were obtained:

| Acid treatment of Alumina | Sodium content of catalyst | Isomerized di-isobutylene in the octene products (boiling 105° C.–120° C.) | Unreacted (boiling 90° C.–105° C.) | Depolymerization products (boiling below 90° C.) | Products boiling above 120° C. |
|---|---|---|---|---|---|
| | | Per cent | | | |
| Sulfamic acid | 0.05 | 86.8 | 2.6 | 75.6 | 4.6 |
| Hydrochloric acid | 0.07 | 8.1 | 37.8 | 34.5 | 1.2 |
| Nitric acid | 0.06 | catalyst practically inert | | | |

The new catalysts may also be used for alkylation, particularly of aromatic hydrocarbons or phenols, with olefins or alcohols. They are also effective in dealkylation reactions, for the dehydrogenation of alcohols and when used with nickel are advantageous for hydrogenation of olefins or dehydrogenation, for example, of naphthenes to aromatic hydrocarbons. The new sulfamic treated alumina catalyst, together with chromium oxide, is also effective in catalyzing hydrogenation and dehydrogenation reactions. Still other metals or compounds may be used with the new catalyst and such combinations are intended to be covered by the attached claims to this catalyst. It will therefore be understood that the following example, showing the superiority of the new catalysts in olefin isomerization, is intended only as one illustration of the many possible applications of the new aluminum oxide compositions of the invention.

Example

Three batches of "Alorco" grade A activated alumina of 4–8 mesh, analyzing 47.6% alumina, less than 0.02% chlorine, 0.46% sodium and 1.7% water, were treated with different acids by agitating equal weights of the alumina with the same volume of acid for 2½ to 5 hours. After the acid treatments the catalysts were thoroughly washed with water, dried for 24 hours at 120° C., and calcined for 2 to 6 hours at 500° C.

This application is a continuation-in-part of our copending application Serial No. 506,012, filed October 12, 1943, now U. S. Patent 2,425,340 wherein the production of gasoline blending agents of increased power output by isomerization of polymers of olefins of 3 to 5 carbon atoms, depolymerization of unisomerized polymers in the product, and hydrogenation of the isomerizate are claimed, using the herein claimed sulfamic treated aluminas or conventional catalysts.

We claim as our invention:

1. An aluminum oxide which has been sulfamic treated for a period of time sufficient to give a product which after calcining at 300° C. to 600° C. contains less than 0.2% sodium.

2. Aluminum oxide which has been treated with an aqueous sulfamic acid solution for a period of time sufficient to give a product which after calcining at 300° C. to 600° C. contains less than 0.1% sodium.

3. A method of producing a catalyst which comprises contacting alumina with an aqueous sulfamic acid solution of 5% to 20% concentration for at least one hour, and calcining the resulting sulfamic acid-containing alumina at 300° C. to 600° C.

ALAN C. NIXON.
ORRIS L. DAVIS.

No references cited.